US007819434B2

(12) United States Patent
Schwenk et al.

(10) Patent No.: US 7,819,434 B2
(45) Date of Patent: Oct. 26, 2010

(54) VALUE DOCUMENT

(75) Inventors: Gerhard Schwenk, Puchheim (DE); Thomas Giering, Kirchseeon (DE); Gerhard Stenzel, München (DE); Wittich Kaule, Emmering (DE)

(73) Assignee: Giesecke & Devrient GmbH, Munich (DE)

( * ) Notice: Subject to any disclaimer, the term of this patent is extended or adjusted under 35 U.S.C. 154(b) by 213 days.

(21) Appl. No.: 10/575,078

(22) PCT Filed: Oct. 5, 2004

(86) PCT No.: PCT/EP2004/011129

§ 371 (c)(1),
(2), (4) Date: Jan. 19, 2007

(87) PCT Pub. No.: WO2005/035261

PCT Pub. Date: Apr. 21, 2005

(65) Prior Publication Data

US 2007/0210574 A1 Sep. 13, 2007

(30) Foreign Application Priority Data

Oct. 8, 2003 (DE) ................................ 103 46 632

(51) Int. Cl.
*B42D 15/00* (2006.01)
*B42D 15/10* (2006.01)
*G09C 3/00* (2006.01)

(52) U.S. Cl. ............................. 283/74; 283/57; 283/72; 283/75; 283/77; 283/86; 283/87; 283/88; 283/89; 283/94; 283/901; 283/904

(58) Field of Classification Search ................... 283/72, 283/74, 75, 77, 86, 94, 901, 904, 57, 87, 283/88, 89
See application file for complete search history.

(56) References Cited

U.S. PATENT DOCUMENTS

| | | | |
|---|---|---|---|
| 3,340,982 | A | 9/1967 | Torley et al. |
| 3,340,983 | A | 9/1967 | Halverson |
| 3,340,984 | A | 9/1967 | Smith |
| 3,371,601 | A | 3/1968 | Lane, Jr. |
| 3,473,027 | A | 10/1969 | Freeman et al. |
| 3,482,095 | A | 12/1969 | Siegel |

(Continued)

FOREIGN PATENT DOCUMENTS

CH 516196 1/1972

(Continued)

OTHER PUBLICATIONS euro 2002, Deutsche Bundesbank, Sep. 2001.

(Continued)

*Primary Examiner*—Dana Ross
*Assistant Examiner*—Justin V Lewis
(74) *Attorney, Agent, or Firm*—Bacon & Thomas, PLLC

(57) ABSTRACT

A value document, in particular a bank note, has a value document substrate and at least one feature substance for authenticity recognition and at least two different feature substances for checking the value document. First and second feature substances are present on or in the value document substrate in the form of mutually independent codings which render, at least partly, the same information, e.g. statement of value, currency, etc.

32 Claims, 1 Drawing Sheet

U.S. PATENT DOCUMENTS

| | | | | |
|---|---|---|---|---|
| 3,486,006 | A | 12/1969 | Siegel | |
| RE27,770 | E | 10/1973 | Siegel | |
| 4,455,039 | A * | 6/1984 | Weitzen et al. | 283/83 |
| 4,463,970 | A | 8/1984 | Kaule et al. | |
| 4,756,557 | A | 7/1988 | Kaule et al. | |
| 5,169,155 | A * | 12/1992 | Soules et al. | 273/293 |
| 5,259,907 | A * | 11/1993 | Soules et al. | 156/277 |
| 6,169,155 | B1 * | 1/2001 | Alvarez et al. | 528/15 |
| 6,344,261 | B1 | 2/2002 | Kaule et al. | |
| 6,357,656 | B1 | 3/2002 | Puff | |
| 6,383,618 | B1 | 5/2002 | Kaule et al. | |
| 6,491,324 | B1 * | 12/2002 | Schmitz et al. | 283/82 |
| 6,506,476 | B1 * | 1/2003 | Kaule et al. | 283/74 |
| 2002/0166647 | A1 | 11/2002 | Attenberger et al. | |
| 2003/0050891 | A1 * | 3/2003 | Cohen | 705/42 |
| 2004/0084277 | A1 * | 5/2004 | Blair | 194/206 |
| 2005/0052519 | A1 | 3/2005 | Mayer et al. | |

FOREIGN PATENT DOCUMENTS

| | | | |
|---|---|---|---|
| DE | 1774290 | | 1/1972 |
| DE | 3048734 | A1 | 7/1982 |
| DE | 3446861 | A1 | 7/1986 |
| DE | 19803997 | A1 | 8/1999 |
| DE | 19804012 | A1 | 8/1999 |
| DE | 19804021 | A1 | 8/1999 |
| DE | 101 20 818 | A1 | 10/2002 |
| DE | 101 49 265 | A1 | 4/2003 |
| DE | 102 04 870 | A1 | 8/2003 |
| EP | 0 052 624 | B1 | 6/1982 |
| EP | 0 053 124 | B1 | 6/1982 |
| EP | 0628927 (A2) | | 6/1994 |
| EP | 0 659 935 | B1 | 6/1995 |
| EP | 0 975 468 | A | 2/2000 |
| EP | 1 253 241 | A2 | 10/2002 |
| GB | 1127043 | | 9/1968 |
| GB | 1234794 | | 6/1971 |
| WO | WO 97/39428 | | 10/1997 |

OTHER PUBLICATIONS

Magdeburger Volksstimme articles, 2001 and 2002.
der Euro, UNSER Geld, European Central Bank, before 2002.
Klaus W. Bender, Geldmacher: Das geheimste Gewerbe der Welt, pp. 140-141, 234-235, Wiley-VCH, 2004.
Peace and Freedom Stamps, 1995.
R.L. Van Renesse, Optical Document Security, pp. 1-29, Artech House, 1997.

* cited by examiner

VALUE DOCUMENT

FIELD OF THE INVENTION

This invention relates to a value document, in particular a bank note, having a value document substrate and at least two different feature substances for checking the value document.

BACKGROUND OF THE INVENTION

The print WO 97/39428 discloses a value document whose substrate has, in one area, different machine authenticatable authenticity features for different security levels. The value document contains a machine authenticatable low security feature which is formed from a single material. Upon an interrogation the low security feature provides a yes/no response indicating the presence or absence of the interrogated property. The low security feature is used for authenticity checking in applications where a simple detector is used, for example retail outlets.

A further, likewise machine authenticatable high security feature has properties that are difficult to detect allowing an in-depth interrogation of the value document and a much higher level of authentication. The check of the high security feature is elaborate and effected for example in central banks. Said high security feature is a homogeneous mixture of two substances with different physical properties, such as the excitation wavelength for a luminescence emission or coercivity, etc.

The system known from WO 97/39428 has the disadvantage, however, of permitting an elaborate authenticity check of the value documents but not allowing any statement about the type or value of the particular value document. For machine processing of value documents, in particular of bank notes, it is also desirable to detect by machine the type of document, e.g. the currency or the denomination of a known currency.

SUMMARY OF THE INVENTION

On these premises the invention is based on the problem of proposing a generic value document that involves not only increased falsification security but at the same time also a possibility of value recognition.

Value recognition is understood in the context of the present invention to mean the evaluation of information present in coded form for a certain user group. The coded information can be, in the case of a bank note, for example the denomination, the currency, the series, the issuing country or other special features of the bank note.

The problem posed is solved by the value document having the features of the main claim. A production method for such value documents as well as two methods for checking or processing such value documents are the subject matter of the co-ordinated claims. Advantageous developments of the invention are the subject matter of the subclaims.

The inventive value document has first and second feature substances which are applied to or incorporated into the value document substrate in the form of mutually independent codings. As explained in detail hereinafter, this combination creates a complex feature system that is very difficult to imitate for a forger. The feature system permits users from different user groups to each carry out both an authenticity check and value recognition on the document. The feature substances, or their characteristic properties, used by the different user groups are completely separate from each other.

For example, users of one user group can use a characteristic property of the first feature substance for the authenticity check and the coding formed by the first feature substance for value recognition. Users of another user group can employ a characteristic property of the second feature substance for the authenticity check, and use the coding formed by the second feature substance for value recognition. The exact implementation of the authenticity check and the value recognition will be described in detail below.

Said user groups may be central banks, commercial banks, any commercial enterprises such as local train services, department stores or vending machine operators, etc.

Analysis of the total feature system is exceptionally difficult and elaborate, since it is not recognizable to third parties which substances and in particular which substance properties are used for the check by the different user groups. Even knowledge of the procedure of one user group does not reveal the substances and methods used for the authenticity check and value recognition by the other user group or groups.

In a preferred embodiment of the inventive value document, a third feature substance is incorporated into the volume of the value document substrate. The third feature substance can fundamentally be incorporated into the volume of the value document substrate in any distribution, but also form a given orderly structure. According to a preferred embodiment of the invention, the third feature substance is distributed substantially uniformly within the volume of the value document substrate, however, so that sufficiently large volume elements of equal size each contain a substantially equal quantity of the third feature substance. The distribution can be regular, but also be effected in a given regular pattern. However, the third feature substance is preferably incorporated into the substrate volume with a random distribution.

If paper is used as the value document substrate, the third feature substance is preferably added to the paper stock before sheet formation.

The marking substance can also be incorporated into the near-surface volume area of a paper substrate. This is done for example by one of the methods described in the prints EP-A-0 659 935 and DE 101 20 818, in which the particles of the marking substance are admixed to a gas stream or a liquid stream and incorporated into a wet paper web. The disclosures of the stated prints are included in the present application in this respect.

One or more of the feature substances are preferably formed by a luminescent substance or a mixture of luminescent substances. It is also possible to employ luminescent substances for all feature substances used. For the first and third feature substances it is preferable to use luminescent substances or mixtures that emit in the infrared spectral range and that in particular have a complex, difficult-to-imitate spectral emission characteristic. Said emission characteristic can be used in particular for distinguishing the luminescent substances from similar luminescent substances. However, it can also be used for producing a coding by the form of the emission or/and excitation spectra of the luminescent substances, which is preferably used for the first feature substance. "Infrared spectral range" is understood according to the invention to be the wavelength range from 750 nm and more, preferably 800 nm and more. According to a preferred embodiment, the second feature substance selected is a luminescent substance whose luminescence can be easily excited and detected with commercially available detectors.

Preferably, at least one of the luminescent feature substances is a luminescent substance based on a host lattice doped with rare earth elements. It is also possible for several or all of the luminescent substances to be formed on the basis of such a doped host lattice. Said luminescent substances can be excited e.g. by irradiating directly into the absorption bands of the rare earth ions. In preferred variants, it is also possible to use absorbent host lattices or so-called sensitizers, which absorb the excitation radiation and transfer it to the rare earth ion, which then emits the luminescence. Obviously, the host lattices and/or the dopants can be different for the different feature substances in order to obtain different excitation and/or emission ranges.

In a preferred embodiment, the host lattice absorbs in the visible spectral range and optionally, in particular in the case of the first or third feature substance, additionally in the near infrared range up to about 1.1 μm. Excitation can then be performed with high effectiveness by light sources, such as halogen lamps, LEDs, lasers, flash lamps or xenon arc lamps, so that only small amounts of the luminescent substance are required. This permits for example an application of the luminescent substance to the value document by usual printing processes. Also, the small amount of substance impedes detection of the used substance by potential forgers. If the host lattice absorbs in the near infrared up to about 1.1 μm, easily detectable emission lines of the rare earth ions can be suppressed, leaving only the emission at larger wavelengths that is more elaborate to detect.

In an alternative preferred embodiment, luminescent substances are used that absorb even in the visible spectral range, preferably over most of the visible spectral range, especially preferably into the near infrared region. Then, too, emissions in these more easily accessible spectral ranges are suppressed.

The host lattice can have for example a perovskite structure or a garnet structure and be doped with a rare earth element emitting in the infrared spectral range, such as praseodymium, neodymium, dysprosium, holmium, erbium, thulium or ytterbium. Further possible embodiments of the host lattice and the dopant are specified in EP-B-0 052 624 or EP-B-0 053 124, whose disclosures are included in the present application in this respect.

The codings can—alternatively or in addition to the coding by the form of the emission or excitation spectra—be any kind of signs or patterns, such as an alpha-numeric character string. Preferably, at least one of the codings is a bar code. A bar code is understood here to mean any one- or two-dimensional pattern consisting of stripes or areas with the feature substance or substances ("bars") and stripes or areas without feature substances located between the bars ("spaces"). As a rule, the bar/space sequence represents a binary number sequence representing any, also encrypted, information about the value document.

The bar code can in particular be invisible to the naked eye and be only detectable by its emission or absorption in a special spectral range after irradiation with a suitable light source. Bar codes are particularly suitable for machine readout and provide an almost fault-free read result, primarily in connection with check digits. Bar codes to be used are for example common formats, such as the 2/5 code, the 2/5 inter-leaved code, the 128 code or the 39 code, but also special formats used only for the inventive value documents. It is also possible to use two-dimensional bar codes offering a particularly strongly condensed recording and increased redundancy, which makes them less sensitive to production tolerances.

The codings formed by the first and second marking substances are mutually independent according to the invention. This preferably means that they are not applied to or incorporated into the same areas of the value document jointly. Instead, the two codings are preferably applied at different places of the value document and/or with different shapes. The two codings can, but do not have to, represent the same information content. In particular, one of the codings can have a higher information content and contain for example, besides the information necessary for value recognition, additional information permitting further authentication of the document. Besides the amount of information, the type of coding can also differ, it being for example possible to use different types of coding and/or different encryption algorithms.

It is preferably provided that at least one of the codings extends over a predominant part of a surface of the value document, in particular over the substantially total surface of the value document. This makes it possible to obtain a further increase in the falsification security of the value document, since gaps or inserted parts of other, including other authentic, documents manifest themselves as a disturbance in said coding.

For example, in the case of documents of the same kind, such as bank notes of the same denomination, such a coding or a part thereof can be provided with a certain offset from document to document. If the documents are produced in a continuous format, this can be obtained for instance by using a print roll whose circumference is a non-integral multiple of the document size. A row of successive documents can then contain a coding with the same content or the same form, the individual documents at the same time being distinguishable from each other due to the different offset. In sheet-by-sheet printing the same result can be achieved if several printing plates with mutually offset codings or coding parts are used according to the desired repetition rate.

The value document substrate is preferably a printed or unprinted cotton fiber paper, cotton/synthetic fiber paper, a cellulosic paper or a coated printed or unprinted plastic film. A multilayer laminated substrate can also be used. The material of the substrate is not essential to the invention, provided that it only allows incorporation or application of the particular feature substances required.

The inventive value documents are preferably bank notes, shares, credit cards, badge or identity cards, passports of any type, visas, vouchers, etc.

The first and/or second feature substances are preferably printed on the value document substrate. For this purpose it is possible to use for example a gravure, screen, letterpress, flexographic, ink-jet, digital, transfer or offset printing process. The printing inks used for this purpose can be transparent or contain additional coloring pigments which must not impair detection of the feature substances. In the case of the luminescent substances, they preferably have transparent areas in the excitation range and viewed emission range of the luminescent substances.

In the case of designs in which the value document has a paper substrate, the first and/or second feature substance can preferably also be already applied to the moist paper web, in particular sprayed on, in the form of the coding during papermaking. For this purpose, the particular feature substance is for example passed onto the paper web surface in a suspension as a laminar jet at low jet pressure at a time when the paper web is still moist but already sufficiently solidified. The low jet pressure prevents the fiber structure of the paper web from changing upon application of the suspension. The place of application can then not be recognized by the naked eye on the finished paper either in reflected light or in transmitted light. Further possibilities and details of the application of the feature substance to a moist paper web are described in the print EP 1 253 241 A2, whose disclosure is included in the present application in this respect. In particularly preferred embodiments, the second feature substance is applied to the moist paper web in the form of the coding, and the first feature substance incorporated into the volume of the paper substrate.

Obviously, further feature substances can be applied, or incorporated into the substrate, e.g. to further increase the falsification security or to include further user groups.

In a method for checking or processing an above-described value document, the authenticity of the value document is checked and a value recognition of the document carried out by using at least one characteristic property of the first and/or second feature substance for checking the authenticity of the value document, and the coding formed by the first and/or second feature substance for value recognition of the value document. The authenticity and the value recognition of the value document are preferably determined by different user groups using different feature substances. That is, if the user belongs to a first user group, the authenticity of the value document is determined using the first feature substance, and the value recognition carried out via the coding represented by the first feature substance. If the user belongs to a second user group, said user has at its disposal at least one characteristic property of the second feature substance for the authenticity check, and the coding formed by the second feature substance for value recognition.

If the value document is provided with a third feature substance, the check or processing by a user of the first user group can be done by using at least one characteristic property of the first and/or third feature substance for checking the authenticity of the value document. For example, some of the users from the first user group can use the first feature substance for the authenticity check, and others the third feature substance.

If the first feature substance is a luminescent substance, the authenticity check or value recognition by a user of the first user group is preferably done by irradiating the first feature substance with radiation from its excitation range, determining the emission at at least one wavelength from the emission range of the first feature substance, and carrying out the check of authenticity and/or the value recognition on the basis of the determined emission.

Analogously, if the second feature substance is a luminescent substance, the authenticity check or value recognition by a user of the second user group is done by irradiating the second feature substance with radiation from its excitation range, determining the emission at at least one wavelength from the emission range of the second feature substance, and carrying out the check of authenticity and/or the value recognition on the basis of the measured emission.

The first and/or second feature substance is advantageously irradiated with visible and/or infrared radiation, and the emission of the irradiated feature substance determined in the infrared spectral range. The irradiation is preferably carried out with a light-emitting diode or laser diode.

In a preferred embodiment of the invention, the presence of a first and/or third feature substance indicates the series or the particular existing upgrade e.g. of a bank-note issue. For example, only the first feature substance can be present in an originally issued currency, and the first and third feature substances in the upgrade of the the currency. After a certain transition period it is conceivable to use only the third feature substance.

The described methods involve the advantage that both user groups can carry out not only the authenticity check but also a value recognition on the document without any great additional effort. A further advantage is that the users of the first and second user groups use, for evaluation, nonoverlapping combinations of the feature substances or the coding formed thereby. Therefore, an analysis of an apparatus for authenticity detection of the second user group, for example, gives no indication of the procedure in the authenticity check of the first user group, since said detection device does not interrogate any of the properties of the first or third feature substance.

Further embodiments as well as advantages of the invention will be explained hereinafter with reference to the figures. For more clarity, the figures do without a representation that is true to scale and to proportion.

DETAILED DESCRIPTION OF THE PREFERRED EMBODIMENTS

Figure 1:
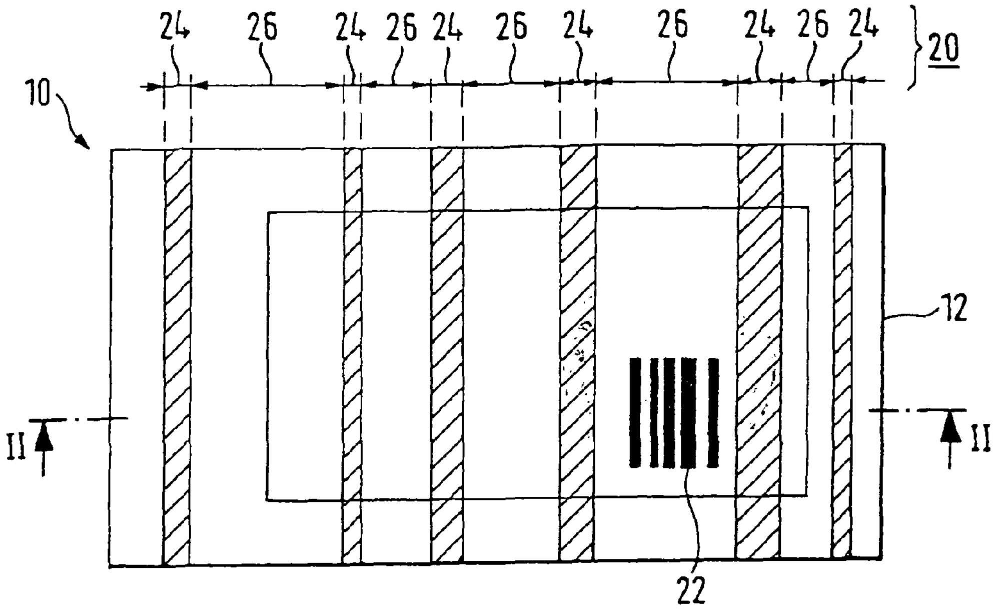
FIG. 1 a schematic representation of a bank note according to one embodiment of the invention, FIG. 2 a section through the bank note of FIG. 1 along the line II-II, and FIGS. 3 and 4 sections of a bank note according to further embodiments of the invention.
Figure 2:
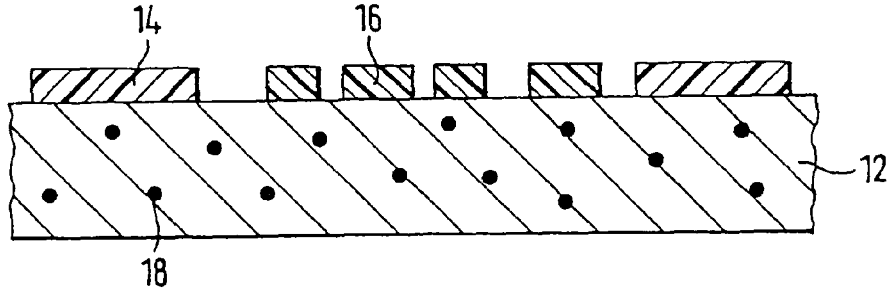

The invention will now be explained by the example of a bank note. First, FIGS. 1 and 2 show schematic representations of a bank note 10 which is equipped with three different feature substances and permits a check of authenticity and a value recognition by different user groups. FIG. 1 shows the bank note 10 in a plan view and FIG. 2 a cross section along the line II-II of FIG. 1.

A first feature substance 16 and a second feature substance 14 are printed on the paper substrate 12 of the bank note 10 in the form of codings 22 and 20, respectively. As seen best in FIG. 2, a third feature substance 18 is furthermore distributed in the form of particles uniformly within the volume of the paper substrate 12. The particles can for this purpose be added to the paper stock or fibrous pulp before sheet formation or be incorporated into the fibrous matrix only after sheet formation. In this embodiment, the third feature substance 18 is a luminescent substance based on a rare earth metal doped host lattice and emitting after excitation in the range from 0.8 to 1.0 μm in the wavelength range around 1.5 μm.

The second feature substance 14 is printed on the front of the bank note 10 in stripe form. The width of the individual stripes 24 and/or the width of the particular spaces 26 constitute a coding 20 in which information about the bank note, in particular the denomination and currency of the bank note 10, is stored in encrypted form. The coding 20 extends substantially over the total surface of the bank note 10. The printing ink used for this purpose is preferably transparent, so that the presence of the coding cannot be recognized visually. The second feature substance 14 is likewise a luminescent substance which is selected specifically so that its luminescence can be easily excited and detected with commercially available detectors in the near infrared.

The first feature substance 16 is also printed on the bank note substrate 12 in the form of a coding 22, in the embodiment in the form of a bar code. In the bar code 22 the denomination and currency of the bank note 10 are stored in coded form. The printing ink used here can also be transparent. Alternatively, it contains any coloring pigments which do not disturb the luminescence check of the feature substance. In this embodiment, the first feature substance 16 is formed by a mixture of different luminescent substances which, after excitation, emits radiation with a complex and difficult-to-imitate spectral distribution. The spectral distribution itself can be evaluated again as a coding.

The authenticity check and the value recognition can now be carried out by two different user groups using different combinations of the three feature substances 14, 16 and 18 or the codings 20 and 22. The bank note 10 of the embodiment is designed for a first user group with high security requirements and a second user group with comparatively low security requirements.

The second user group can involve for example simple machines taking bank notes in parking lots, or vending machines. For this use it is particularly expedient to employ inexpensive detection apparatuses for the authenticity check and value recognition.

A user of the second user group checks the authenticity of a bank note 10 by irradiating the bank note with light from the excitation range of the second feature substance 14 and detecting a corresponding luminescence signal. If a correct luminescence signal is received, the bank note is rated as authentic by the user. The presence of the correct luminescence signal suffices, no spatially resolved evaluation or analysis of the emission spectrum being required for the authenticity check. Due to the choice of the luminescent substance 14 this detection can be effected very simply and with commercially available, inexpensive detectors. If the bank note is recognized as authentic, its value can be taken from the bar code 20 if the coding scheme is known. The authenticity check and the value recognition can of course also be carried out in one step.

The first user group with its higher security requirements can comprise for example banks, where the authenticity of the bank notes is checked with high-quality and elaborate detectors. The first feature substance 16 with its complex spectral emission serves this user group for the authenticity check. The authenticity check is preferably based on the detection of the concrete luminescence emission. Alternatively or in addition, the third feature substance 18 with its difficult-to-detect infrared emission at 1.5 μm can be used as an authenticity mark The value recognition of the bank note is performed by a user of the first user group with the help of the bar code 22 formed by the first feature substance. In addition or as an alternative to the bar code, the value recognition can be performed by a user of the first user group by an in-depth analysis of the emission spectrum, whereby half-widths and/or luminescence peak intervals and/or decay times, etc., are rated. Due to the emission of the first feature substance, the information content of the bar code can be read with an elaborate infrared detector, for example by scanning a line along the line II-II of FIG. 1.

The second user group and the first user group, if the latter has access to the data of the second feature substances, can at the same time also use the coded representation of the information contained in the bar code 20 as an additional authenticity check on the bank note 10. For example, it can be provided that only certain combinations of stripe widths 22 and space widths 24 form permissible codings. Stripes that are too wide or too narrow, as can easily appear upon attempts at tampering with the bank note, are recognized as impermissible in the check of the bank notes, and the bank note rejected as being tampered with. Codings that are fundamentally permissible but cannot occur in the checking context can also be recognized and rejected.

The bar code 20 can contain the same information as the bar code 22, but in some embodiments it contains additional information going beyond the information required for value recognition and permitting a further check of the authenticity of the bank note 10.

Both user groups use nonoverlapping feature substance systems for the authenticity check and value recognition according to the invention. This results in the additional essential advantage that an analysis of a comparatively easily accessible apparatus for detection of authenticity of the second user group does not give any indication of the procedure and basic principles of the authenticity check or the value recognition of the first user group.

Figure 3:
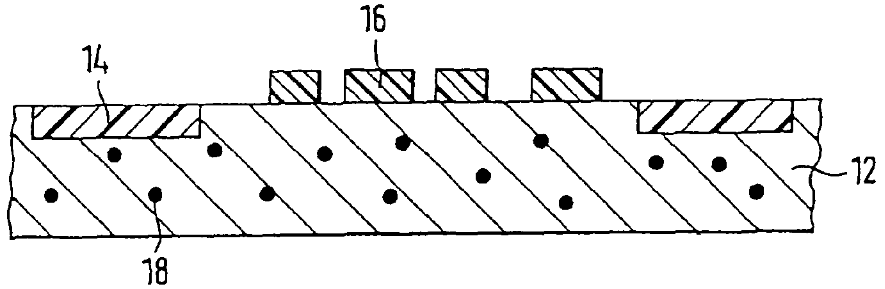

FIG. 3 shows a further embodiment of the invention in which the second feature substance 14 was already sprayed onto the still moist paper web in the form of the bar code 20 during papermaking. In the finished bank note the coding 20 is then located below the uppermost size layer of the paper substrate 12.

Figure 4:
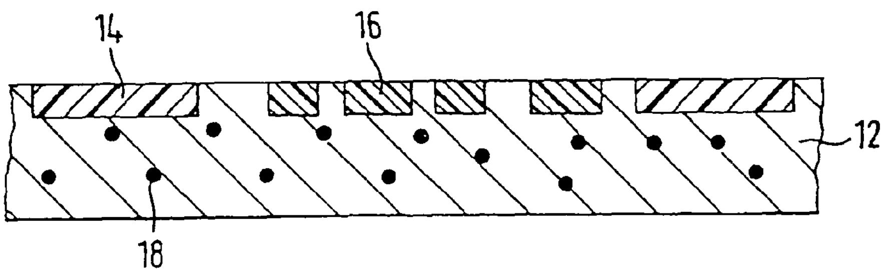

Alternatively or in addition, the first feature substance 16 can be sprayed onto the still moist paper web in the form of the bar code 22 during papermaking. FIG. 4 shows an embodiment in which both codings 20 and 22 are disposed under the size layer of the paper substrate 12.

The invention claimed is:

1. A value document, comprising:

a value document substrate and at least two different feature substances for checking the value document, wherein first and second feature substances form mutually independent codings, the second feature substance being applied to the value document substrate, and the first feature substance being applied to the value document substrate or incorporated into the volume of the substrate;

wherein the first feature substance is formed by at least one of a luminescent substance and a mixture of luminescent substances, having a complex spectral distribution;

wherein said spectral distribution itself forms a coding.

2. The value document according to claim 1, including a third feature substance incorporated into the volume of the substrate of the value document.

3. The value document according to claim 2, wherein the third feature substance is distributed substantially uniformly within the volume of the value document substrate.

4. The value document according to claim 1, wherein the second feature substance is formed by at least one of a luminescent substance and a mixture of luminescent substances.

5. The value document according to claim 1, wherein at least one of the feature substances is formed on the basis of a host lattice doped with rare earth elements.

6. The value document according to claim 1, wherein at least one coding extends over a predominant part of a surface of the value document.

7. The value document according to claim 1, wherein at least one coding is a bar code.

8. The value document according to claim 1, wherein a coding lies in the material properties of the second feature substance.

9. The value document according to claim 1, wherein at least one coding represents information about the value document, the information being present in at least one of encrypted and unencrypted form.

10. The value document according to claim 1, wherein the codings formed by the first and second feature substances are either or both applied at different places of the value document and applied with different shapes on the value document.

11. The value document according to claim 1, wherein the codings formed by the first and second feature substances represent different information contents.

12. The value document according to claim 1, wherein the value document substrate comprises a printed or unprinted cotton fiber paper.

13. The value document according to claim 1, wherein the value document substrate comprises a printed or unprinted plastic film.

14. The value document according to claim 1, wherein the substrate is paper having the form of a moist paper web during production, and wherein at least one of the first and second feature substances is printed on the value document substrate.

15. The value document according to claim 1, wherein at least one of the first and second feature substances is applied to the moist paper web in the form of the coding during papermaking.

16. The value document according to claim 1, wherein the first feature substance is present within the volume of the value document substrate or near the surface in the substrate.

17. The value document according to claim 1, wherein at least one of the first and second feature substances is colorless or has only little inherent color in the visible spectral range.

18. A method for producing a value document, comprising the steps:

providing first and second feature substances forming mutually independent codings, the second feature substance being applied to a value document substrate, and the first feature substance either or both being applied to the value document substrate and incorporated into the volume of the value document substrate;

forming the first feature substance from at least one of a luminescent substance and a mixture of luminescent substances, having a complex spectral distribution; and forming a coding from said spectral distribution itself.

19. The production method according to claim 18, wherein the first and/or second feature substance is printed on the value document substrate.

20. The production method according to claim 18, wherein the value document substrate is formed by a printed or unprinted cotton paper, and wherein at least one of the first and second feature substances is sprayed onto the moist paper web during papermaking.

21. The production method according to claim 18, wherein a third feature substance is incorporated into the value document substrate.

22. A method for checking or processing a value document according to claim 1, comprising the steps:

checking the authenticity of the value document and carrying out a value recognition of the document by using at least one characteristic property of at least one of the first and second feature substances for checking the authenticity of the value document, and the coding formed by at least one of the first and second feature substances for the value recognition of the value document; and when selecting the first feature substance to check the authenticity of the value document, checking the authenticity of the value document on the basis of the coding formed by said spectral distribution itself.

23. The method according to claim 22, wherein at least one characteristic property of the first feature substance is used for checking the authenticity of the value document, and the coding formed by the first feature substance for the value recognition of the value document, by a user of a first user group.

24. The method according to claim 22, wherein at least one characteristic property of the second feature substance is used for checking the authenticity of the value document, and the coding formed by the second feature substance for the value recognition of the value document, by a user of a second user group.

25. The method according to claim 22, wherein at least one characteristic property of at least one of the first and third feature substances is used for checking the authenticity of the value document, and the coding formed by the first feature substance is used for the value recognition of the value document, if the user belongs to a first user group, and at least one characteristic property of the second feature substance is used for checking the authenticity of the value document, and the coding formed by the second feature substance is used for the value recognition of the value document, if the user belongs to a second user group.

26. The method according to claim 22, wherein the first feature substance is a luminescent substance, and for the authenticity check or value recognition by a user of a first user group, the first feature substance is irradiated with radiation from its excitation range, the emission is determined at least one wavelength from the emission range of the first feature substance, and at least one of the check of authenticity and the value recognition is carried out on the basis of the determined emission.

27. The method according to claim 22, wherein the second feature substance is a luminescent substance, for the authenticity check or value recognition by a user of a second user group the second feature substance is irradiated with radiation from its excitation range, the emission is determined at least one wavelength from the emission range of the second feature substance, and either or both the check of authenticity and the value recognition is carried out on the basis of the determined emission.

28. The method according to claim 26, wherein at least one of the first and second feature substances is irradiated with at least one of visible and infrared radiation, and the emission of the irradiated feature substance is determined in the infrared spectral range.

29. The method according to claim 26, wherein the irradiation is performed with at least one of a light-emitting diode and a laser diode.

30. The value document according to claim 6, wherein the coding extends over substantially the total surface of the value document.

31. The value document according to claim 8, wherein the material properties are in the form of at least one of emission and excitation spectra.

32. The value document according to claim 15, wherein the second feature substance is sprayed on the moist paper web in the form of the coding.

* * * * *